United States Patent
Aulick et al.

(10) Patent No.: US 10,011,508 B2
(45) Date of Patent: Jul. 3, 2018

(54) CORROSION CONTROL COMPOSITION FOR WATER TREATMENT PROCESS

(71) Applicants: Timothy Aulick, Nicholasville, KY (US); Donald Adams, Lexington, KY (US)

(72) Inventors: Timothy Aulick, Nicholasville, KY (US); Donald Adams, Lexington, KY (US)

(73) Assignee: Aulick Chemical Solutions, Inc., Nicholasville, KY (US)

( * ) Notice: Subject to any disclaimer, the term of this patent is extended or adjusted under 35 U.S.C. 154(b) by 595 days.

(21) Appl. No.: 13/999,498

(22) Filed: Mar. 4, 2014

(65) Prior Publication Data

US 2014/0360943 A1    Dec. 11, 2014

Related U.S. Application Data

(60) Provisional application No. 61/851,265, filed on Mar. 4, 2013.

(51) Int. Cl.
| | |
|---|---|
| *C02F 5/08* | (2006.01) |
| *C23F 11/08* | (2006.01) |
| *C23F 11/12* | (2006.01) |
| *C23F 11/18* | (2006.01) |
| *C23F 14/02* | (2006.01) |
| *C02F 103/02* | (2006.01) |

(52) U.S. Cl.
CPC .............. *C02F 5/086* (2013.01); *C23F 11/08* (2013.01); *C23F 11/124* (2013.01); *C23F 11/188* (2013.01); *C23F 14/02* (2013.01); *C02F 2103/023* (2013.01); *C02F 2303/08* (2013.01)

(58) Field of Classification Search
None
See application file for complete search history.

(56) References Cited

U.S. PATENT DOCUMENTS

| | | | | |
|---|---|---|---|---|
| 3,793,194 A | * | 2/1974 | Zecher | C23F 11/08 210/697 |
| RE28,553 E | | 9/1975 | von Freyhold | |
| 4,384,979 A | | 5/1983 | Hansen | |
| 4,640,793 A | | 2/1987 | Persinski | |
| 4,701,262 A | | 10/1987 | Chen | |
| 4,806,259 A | * | 2/1989 | Amjad | B01D 65/02 210/699 |
| 4,975,219 A | | 12/1990 | Sato | |
| 5,227,133 A | * | 7/1993 | Bucher | C23F 11/188 210/697 |
| 5,401,419 A | | 3/1995 | Kocib | |
| 5,522,992 A | * | 6/1996 | Cervantes | C02F 1/505 204/155 |
| 6,200,529 B1 | | 3/2001 | Riggs | |
| 6,365,101 B1 | | 4/2002 | Nguyen | |
| 6,620,328 B2 | | 9/2003 | Zidovec | |
| 6,863,830 B1 | | 3/2005 | Purdy | |
| 7,252,769 B2 | | 8/2007 | Dickinson | |
| 7,459,513 B2 | | 12/2008 | Guzmann | |
| 7,537,705 B2 | | 5/2009 | Voeller | |
| 7,699,991 B2 | | 4/2010 | Owens | |
| 7,960,455 B2 | | 6/2011 | Nied | |
| 7,964,686 B2 | | 6/2011 | Rodrigues | |
| 8,067,321 B2 | | 11/2011 | Gard | |
| 2002/0017494 A1 | | 2/2002 | Haase | |
| 2002/0094299 A1 | | 7/2002 | Nguyen | |
| 2007/0055022 A1 | | 3/2007 | Baum | |
| 2007/0093609 A1 | | 4/2007 | Guzmann | |
| 2008/0257831 A1 | * | 10/2008 | Nakajima | C09D 5/084 210/749 |

* cited by examiner

*Primary Examiner* — Clare M Perrin
(74) *Attorney, Agent, or Firm* — Carrithers Law Office, PLLC

(57) ABSTRACT

The present invention relates to a water treatment composition comprising blended phosphates which exhibit a synergistic effect for corrosion and scale control and as a sequestering chemical treatment of potable water and more particularly to chemistry which lowers the phosphate concentration necessary to achieve effective corrosion prevention. The composition controls corrosion and cleans the water distribution line by removing scale, tuberculation, and biofilm. Sequestration of the heavy metals and soft metals such as iron, manganese, calcium, and magnesium provides complete solubility of the material to be removed from the metal surface. The inclusion of citric acid with the blended phosphate formula improves drinking water quality in 2 ways: 1) a reducing agent reverses the oxidation of metals which would convert metal to metal salts (copper/lead, etc.) and 2) by chelation, it encapsulates transition metal cations, especially Manganese and Iron, found while source water passes through the treatment process and the drinking water distribution piping network.

10 Claims, No Drawings

CORROSION CONTROL COMPOSITION FOR WATER TREATMENT PROCESS

CROSS REFERENCE TO RELATED APPLICATIONS

This application claims priority from Provisional Application Ser. No. 60/851,265 filed on Mar. 4, 2013 which is incorporated by reference herein in its entirety.

FIELD OF INVENTION

This invention relates to a potable water treatment system and corrosion control composition for inhibiting the growth of scale by using a blend of corrosion inhibitors including a monosodium phosphate, a sodium tripolyphosphate, sodium hexametaphosphate, and citric acid which exhibit a synergistic effect providing an effective treatment even at temperature over 250° F. and a pH of 4.6.

BACKGROUND OF INVENTION

In the treatment of nature's water for human consumption, man has developed several chemical methods along the way to make safe to drink and enhance its purity. Initially, disinfection was an early issue. Halogens such as (bromine, chlorine, iodine, et. al.) proved useful to disinfect pathogens found in water. Chlorine early took control of the market due to cost and availability. Other chemicals have proved useful for disinfection such as hydrogen peroxides, ($ClO_2$), permanganates, chloroamines, bleach, et. al.), and research continues the study of pathogen removal. However, these disinfectants also are classified as chemical oxidizers which may need consideration in chemical processes in aqueous systems (water treatment).

Dirt or turbidity removal from surface water became an issue and $AlSO_4$ was an early coagulant useful to remove (dropout) particulate. Other chemicals and chemical blends have since been found useful to remove dirt and research continues to develop new and improved chemical products for this application.

Similarly, corrosion in iron piping for transporting drinking water to communities became a concern. An early effort at corrosion control used chemicals and the aqueous property of pH to effect internal coating of the pipes with calcium carbonates. The Langelier Saturation Index is a calculated number used to predict the calcium carbonate stability of water. It indicates whether the water will precipitate, dissolve, or be in equilibrium with calcium carbonate. Langelier developed a method for predicting the pH at which water is saturated in calcium carbonate. The LSI is expressed as the difference between the actual system pH and the saturation pH. For LSI>0, water is super saturated and tends to precipitate a scale layer of $CaCO_3$. For LSI=0, water is saturated (in equilibrium) with $CaCO_3$. A scale layer of $CaCO_3$ is neither precipitated nor dissolved. For LSI<0, water is under saturated and tends to dissolve solid $CaCO_3$. If the actual pH of the water is below the calculated saturation pH, the LSI is negative and the water has a very limited scaling potential. If the actual pH exceeds the saturation pH, the LSI is positive, and being supersaturated with $CaCO_3$, the water has a tendency to form scale. At increasing positive index values, the scaling potential increases. It is also worth noting that the LSI is temperature sensitive. The LSI becomes more positive as the water temperature increases. This increase in temperature can cause scaling, especially in cases such as hot water heaters. Conversely, systems that reduce water temperature will have less scaling. However, the use of the Langlier Index did not prove applicable in some waters and was difficult to use in many other waters. Also, in many surface water treatment systems the precipitation of calcium accumulates to the point of restricting water flow rate.

The water often contains dissolved salts of barium, calcium, magnesium, etc. which exist in such waters in form of soluble salts, usually sulphates, bicarbonate, or chlorides with the soluble salts being ionized so that the waters contain a relatively large concentration of free calcium and/or magnesium ions which can lead to scale and sludge deposits. Other metal ions such as iron or aluminum may be present as contaminants. Scale can cause rapid localized corrosion and subsequent penetration of metallic surfaces through the formation of differential oxygen concentration cells and is often referred to a as under deposit corrosion. Upon application of water softening compounds such as sodium carbonate, trisodium phosphate, sodium phosphate and sodium silicate the calcium and magnesium ions in the water are converted in part into insoluble salts which are precipitated and removable; however, the free sodium ions remain and result in water having a high alkaline content which is undesirable due to its damage to skin or fabrics. The alkaline cations such as calcium, magnesium, iron, copper, aluminum and silica ions form scale deposits which crystallize directly on inner metal surface of water conduits and containers, and sludge deposits of salts that have precipitated therefrom which settle at low flow points.

Inorganic phosphates such as (tripolyphosphoric acid, pyrophosphoric acid, hexametaphosphoric acid), and organic phosphoric esters acids such as (alkyl phosphate and alkyl phosphite) were introduced to reduce calcium carbonate scaling in water lines by eliminating calcium carbonate scale formation. However, as set forth in U.S. Patent publication 20020017494 by Haase, inorganic polyphosphoric acids, phosphonic acids and organic phosphoric esters used in low concentration can adversely act to enhance corrosion and when added in high concentration can lead to the formation of scale in that the inorganic polyphosphoric acids are hydrolyzed in water to produce orthophosphoric acid ions which act upon polyvalent metal ions such as the calcium ions to form insoluble precipitates. The phosphonic acids and organic phosphoric acid esters are hydrolyzed in water to form insoluble precipitates.

DESCRIPTION OF THE PRIOR ART

Several related patents relevant to the present invention included: U.S. Pat. No. 4,975,219 by Sato et al. for a corrosion inhibitor for boiler water systems which teaches the use of SHMP, STPP and MONOSP to be used in combination with tannic acid or a salt; however the formulation is dependent upon the addition of a sugar. U.S. Pat. No. 7,964,686 teaches the use of a citric acid in an acid cleaner and a sodium tripolyphosphate as an alkaline cleaner. U.S. Pat. No. 6,620,328 by Zidovec teaches a process for inhibiting the formation of barium sulfate scale on a metal surface in an open cooling water system with a composition containing sodium hexametaphosphate and sodium tripolyphosphate together with a phosphino-acrylic polymer. U.S. Pat. No. 5,468,393 by Zidovec et al, teaches methods of controlling scale formation in the present of metal ions in aqueous systems. RE 28,533 by von Freyhold teaches a method for inhibiting corrosion and mineral deposits in water systems utilizing diphosphonic compounds with a compound containing phosphonates and N-dimethylenephosphonic acid radicals.

SUMMARY OF THE INVENTION

Conventional treatment of water was accomplished by the addition of phosphates to water to provide a potable water supply. Chemical water treatment using precipitating agents such as soda ash "sodium phosphate" which contain anions "phosphates" maintain the solid impurities in a suspended state. Phosphoric acid and its salts were found to be applicable for corrosion control and early on simple orthophosphates showed promise to control corrosion in iron piping by deposition on the pipe surface. However, this technique, like Langier Index, was not effective in unclean metal piping. A clean surface is necessary for the iron on the surface to react with acid or salt. Phosphates are good cleaners to one degree or another. Thus, controlled cleaning and corrosion control can be conducted simultaneously which improves the water and system quality. Thus, phosphoric acid, trisodium phosphate, zinc ortho phosphate, and disodium phosphate while applicable in some instances of corrosion control were found not to be suitable components capable of exhibiting the synergistic effect provided by the scale and corrosion inhibiting effects of the present invention.

Polymer piping and concrete conduits are proving useful to replace iron in water transport from the water treatment plant to the faucet. Polyphosphates have been added to clean and sequester soluble metal cations in water that exhibit the chemical valence of +2 (Calcium and Magnesium) and transition metal cations of the same valence such as iron, manganese, tin, cadmium, zinc, et.al. Some of these additives exhibit color and, if oxidized, to other valence states, may be precipitated out of salutation. Sequestration renders these cations inert by encapsulation of the cation by the poly-phosphate molecule and hence removes it from chemical activity while maintaining solubility in the aqueous medium. The polyphosphates function as both scale inhibitors and metal ion binders. A large amount of polyphosphates can often overcome the interference of AL or Fe ions, however, the cost is prohibitive; however, the combination inhibitor package of the present composition provides a scale inhibitor which is effective a low dosages when combined with a low cost metal ion binding agent such as a citric or tartaric acid, and a sodium hexametaphosphate exhibiting a synergistic effect.

Restrictions on the use of phosphates are increasing due to environmental concerns. The present invention provides a chemical composition using lower phosphate concentration while remaining effective as a corrosion inhibitor. Corrosion control of a pipe having preexisting scale only occurs once the scaling and buildup has been removed from the pipe wall. Once the pipe surface is exposed, corrosion control can occur. Sequestration occurs when sequestrants form soluble complexes and inactivates the cations from re-precipitating or re-scaling. The instant composition controls corrosion and cleans the water distribution line by removing scale, tuberculation, and biofilm. Sequestration of the heavy metals and soft metals such as iron, manganese, calcium, and magnesium provides complete solubility of the material to be removed from the metal surface. The composition provides a means for stable chemical interaction to clean, control corrosion and sequester at increased temperatures of over 250° F. and pH levels as low as 4.6.

Even though phosphates can be used to treat potable water, typically no chelating or dispersing polymers are added to prevent calcium phosphate buildup. There are also dosage limits in potable water as to how much phosphates can be added to potable water. The present invention utilizes certified additives as defined under NSF, title 60, useful for ortho-poly phosphate blends to resist the oxidation of metals, specifically copper and lead that exist in household plumbing systems. These chemically-reducing additives will further increase the quality of drinking water at the faucet.

The corrosion control formulation of the present invention cleans the pipe wall surface, reduces the valence state of the metals, sequesters the metal ions, chelates the insoluble to become soluble, and controls oxidation of the exposed copper, lead, and iron surfaces.

The present invention provides a corrosion control composition for inhibiting the corrosion of metals and inhibiting mineral scale based on 100 parts by weight, comprising or consisting essentially a monosodium phosphate in an amount of from 17 to 36 percent by weight; a sodium tripolyphosphate in an amount of from 3 to 12 percent by weight; a sodium hexametaphosphate in an amount of from 30 to 65 percent by weight and more preferably from 45 to 75 percent by weight; and a citric acid in an amount of from 11 to 50 percent by weight. The corrosion control composition can be diluted in water producing a product concentrate solution of from to 33 to 35 percent by weight having a density of 11.4 pounds per gallon, a specific gravity of from between 1.3 and 1.35, an ortho/poly ratio of 25/75, a pH range of from 6 to 9, and a temperature stability range form from −25° F. to 250° F.

A preferred embodiment of the present invention comprises, consists of, or consists of an effective amount of a corrosion control composition for inhibiting the corrosion of metals and inhibiting mineral scale based on 100 parts by weight, comprising, consisting, and/or consisting essentially of an effective amount of monosodium phosphate; an effective amount of sodium tripolyphosphate; an effective amount of sodium hexametaphosphate; and an effective amount of a citric acid, a sodium phosphonate, a sodium phosphite, a phosphorous acid, and combinations thereof.

More particularly a corrosion control composition for inhibiting the corrosion of metals and inhibiting mineral scale based on 100 parts by weight, comprises, consists, and/or consists essentially of monosodium phosphate in an amount of about 18 percent by weight; a sodium tripolyphosphate in an amount of about 8 percent by weight; a sodium hexametaphosphate in an amount of about 63 percent by weight; and a citric acid in an amount of about 11 percent by weight. Furthermore, alternatives for citric acid include sodium phosphonate, sodium phosphite, and phosphorous acid, and combinations thereof for application to water to be treated at a level of about 10 to 25 mg/liter.

An embodiment of the corrosion control composition for inhibiting the corrosion of metals and inhibiting mineral scale based on 100 parts by weight comprises, consists, or consist essentially of an polyphosphate having a degree of polymerization between 6 and 21 in an amount of from between 30 to 65 percent by weight; a tripolyphosphate having a degree of polymerization of from between 2-3.5 in an amount of from between 3 to 12 percent by weight; a monosodium phosphate in an amount of from between 17 to 36 percent by weight; and an reducing and binding agent in amount of from between 11 to 50 percent by weight for application to water to be treated at a level of about 10 to 25 mg/liter.

It is an object of the present invention to provide enhanced reactivity in cleaning of water distribution system and water treatment facility.

It is another object of the present invention to provide a means for reduction of oxidized impurities including iron and manganese followed by sequestration.

It is another object of the present invention to provide a means for chelation of material impurities removed from water treatment plant facility walls and distribution pipes without disturbing clarity of the water.

It is another object of the present invention to provide means for inhibiting oxidation of pure metals including copper, lead, zinc, and tin.

It is another object of the present invention to provide a composition which enhances reactivity, reduces oxidized impurities, chelates impurities and inhibits oxidation of pure metals which is not residence time dependent.

It is another object of the present invention to provide a corrosion inhibiting composition of blended phosphates that are fully functional within the regulatory pH limits of 4.6 to 9.0 and more preferably from 6.0 to 9.0 in order that the product is versatile with respect to pH because of variation of pH of water during processing and independent of the pH in different locations in the processing plant.

It is another object of the present invention to provide a corrosion inhibiting composition of blended phosphates that are fully functional and stable at temperatures above 250° F.

It is another object of the present invention to provide a corrosion inhibiting composition of blended phosphates to maximize the molecular chain lengths of its phosphates without hindering the molecular structure stability to effect corrosion control, cleaning and sequestration.

It is another object of the present invention to provides a scale inhibitor composition which is effective a low dosages when combined with a low cost metal ion binding agent such as a citric or tartaric acid, and a sodium hexametaphosphate.

It is another object of the present invention to provide a chemical composition using lower phosphate concentration while remaining effective as a corrosion inhibitor.

It is another object of the present invention to provide a corrosion inhibiting composition which provides a protective coating on new or clean metal conduits to passivate the metal surface preventing corrosion and to coat plastic or concrete conduits preventing formation of biofilms and an increase in chlorine demand in the distribution system.

DESCRIPTION OF THE PREFERRED EMBODIMENT

The density of water is 1.00 g/mL and 1 liter of water weights 1 kilogram. Consequently, 1 ppm corresponds to 1 mg/L and one part per million (ppm) denotes one part per 1000000 parts, one part in $10^6$. Therefore, $1/1000000 \times 100\% = 0.0001\%$ (or $1\% = 10000$ ppm), and has a value of $1 \times 10^{-6}$.

The instant invention is particularly directed toward use of an effective amount of a corrosion inhibiting composition comprising sodium hexametaphosphate $(NaPO_3)_6$ in an amount of about 63 percent by weight, sodium tripolyphosphate $(Na_5O(PO_3)_3)$ in an amount of about 8 percent by weight, monosodium phosphate $(NaH_2PO_4)$ in an amount of about 18 percent by weight, and citrus acid $(C_6H_8O_7)$ in an amount of about 11 percent by weight. The resulting composition has a product concentration of from 33 to 35 percent by weight upon dilution with water to provide a gallon of fluid has a density of about 11.4 pounds per gallon and a specific gravity of from between 1.3 and 1.35, a ortho/poly ratio of 25/75, a pH range of from 6 to 9, and temperature stability range of from −25° F. to at least 250° F. The concentrate solution is applied at a level of about 10 to 25 mg/liter to the water to be treated.

Moreover, an effective amount of sodium hexametaphosphate ranges from about 30 to 65% by weight, an effective amount of monosodium phosphate ranges from about 17 to 36 percent by weight, an effective amount of sodium tripolyphosphate ranges from about 3 to 12 percent by weight, and an effective amount of citric acid ranges from about 11 to 50 percent by weight.

Sodium hexametaphosphate (SHMP) or sodium polymetaphosphate is a hexamer of composition $(NAPO_3)_6$. It is a polyphosphate typically having a degree of polymerization between 6 and 21 such as sodium and potassium salts of hexamethaphosphate, preferably the sodium salts, but it can also be a potassium salt. It is typically a mixture of polymeric metaphosphates which includes the hexamer. It hydrolyzes in an aqueous solution and particularly in acidic conditions to sodium trimetaphosphate and sodium orthophosphate. It is used as a sequestrant and is useful as a dispersing agent to break down clay and other soil types. It is also a deflocculant causing heavy particles to drop to the bottom allowing fine particles to be siphoned off. Sodium hexametaphosphate is present in an effective amount in a range of from 30-65 percent by weight and more preferably about 63 percent by weight of the composition prior to dilution with water.

Trisodium phosphate (TSP) or sodium tripolyphosphate (STPP) is an inorganic compound with the formula $(Na_5P_3O_{10})$. It is the sodium salt of the polyphosphate penta-anion, which is the conjugate base of triphosphoric acid. It is contemplated that the potassium salt is effective as well. The polyphosphates such as sodium or potassium salts of tripolyphosphate or pyrophosphate have a degree of polymerization of from between 2-3.5. In hard water that contains high concentrations of $Mg^{2+}$ and $Ca^{2+}$ detergents are deactivated; however STP is a highly charged chelating agent which binds to cations tightly and prevents them from interfering with the sulfonate detergents. STP can be hydrolyzed to orthophosphate which can be assimilated by algae and other microorganisms. Sodium triphosphate is present in an effective amount in a range of from about 3 to 12 percent by weight and more preferably about 8 percent by weight of the composition prior to dilution of water.

Monosodium phosphate $(NaH_2PO_4)$ is also know as anhydrous monobasic sodium phosphate and sodium dihydrogen phosphate. It is a chemical compound of sodium with a phosphate counter ion. Monosodium phosphate is present in an effective amount in a range of from 17 to 36 percent by weight and more preferably about 18 percent by weight prior to dilution with water.

The citric acid in the instant application acts as a reducing agent and low cost metal ion binding agent, and chelates insoluble compounds and making them soluble in the water leaving a homogeneous solution. Citric acid is an especially effective reducing agent for +2 and +3 manganese Citric acid is present in an effective amount in a range of from 11% to 50% by weight, more preferably at about 11% by weight prior to dilution with water. Alternative citric acid compounds include tartaric acid, sodium phosphonates, sodium phosphate, phosphorous acid and oxalic acid.

The instant composition controls corrosion and cleans the water distribution line by removing scale, tuberculation, and biofilm. Sequestration of the heavy metals and soft metals such as iron, manganese, calcium, and magnesium provides complete solubility of the material to be removed from the metal surface.

MECHANISM

There are two major types of phosphates certified for use with potable water treatment, orthophosphates and polyphosphates. Polyphosphates include pyrophosphates and polyphosphates which may be condensed or linear. Each component functions differently with respect to pH, solubility, thermal stability, color control, corrosion control and reversion rate.

While phosphates function to clean and attack the corrosion problem, linear polyphosphates also exhibit the capability to sequester heavy and soft metal ions with a valance of +2, which includes iron, manganese, calcium and magnesium. Color in drinking water comes from Mn+4 and Fe+3 and cannot be sequestered. Sequestration of Mn and Fe has to be done at a +2 state. Sequestration or iron and manganese cations prevent color formation by binding the +2 cations to prevent their oxidation to colored cations. The binding of calcium and magnesium cations (sequestration) acts to soften the water, also improving the water quality.

The citric acid (sodium phosphonates, sodium phosphite, oxalic acid (and its salts), and phosphorous acid) in the instant composition acts as a reducing agent to reduce the valence state to a +2 state. At this time the Mn and Fe can be sequestered. Lead and Copper are both insoluble metals, but when exposed to an oxidative environment, lead and copper will form soluble salts. Government regulations tighten everyday restricting copper and lead from being present in drinking water. The instant composition forms an aqueous environment that resists the oxidation of the metal surfaces, specifically, copper and lead. The equilibrium of water is the quantitative amount of $H_2O$ in solution versus [H+] cations and [OH−] anions. The use of the instant composition and its reducing agents shifts the equilibrium to a point of highest stability for copper and lead atoms to remain in insoluble metallic form on the pipe surfaces. The equilibrium of water is to maximize homogeniality. Other products claim to sequester, clean, control corrosion, and reduce copper and lead content in water distribution systems. However, these products produce a heterogeneous solution, decreasing stability and equilibrium. The present invention reduces iron and manganese thereby cleaning pipe walls, controlling corrosion, and reducing copper and lead content, in addition to chelating impurities to maximize homogeniality. The present formulation also cleans impurities off the water distribution pipe walls. This is a physical process. The citric acid in the instant application acts as a reducing agent and chelates insoluble compounds and making them soluble in the water leaving a homogeneous solution.

PREPARATION

The instant invention is particularly directed use of an effective amount of a corrosion inhibiting composition comprising sodium hexametaphosphate in an amount of about 63 percent by weight, sodium tripolyphosphate in an amount of about 8 percent by weight, monosodium phosphate in an amount of about 18 percent by weight, and citrus acid in an amount of about 11 percent by weight. The composition is diluted with water to a 33-35% by weight concentration by weight. The product concentrate solution is applied to a quantity of water to be treated in a range of from 10 to 25 mg/liter of water.

The following examples further describe the polishing compositions of the instant invention, methods of using the polishing compositions, and the tests performed to determine the various characteristics of the polishing compositions. The examples are provided for exemplary purposes to facilitate understanding of the invention and should not be construed to limit the invention to the examples.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A corrosion control composition for inhibiting the corrosion of metals and inhibiting mineral scale based on 100 parts by weight, consisting of:
    a monosodium phosphate in an amount of 17-18 percent by weight;
    a sodium tripolyphosphate in an amount of from 3 to 12 percent by weight;
    a sodium hexametaphosphate in an amount of from 30 to 65 percent by weight; and
    a citric acid in an amount of from 11 to 50 percent by weight.

2. A corrosion control composition for inhibiting the corrosion of metals and inhibiting mineral scale based on 100 parts by weight, consisting of:
    a monosodium phosphate in an amount of about 18 percent by weight;
    a polyphosphate selected from the group consisting of a sodium tripolyphosphate, a potassium tripoloyphosphate, and combinations thereof present in an amount of about 8 percent by weight;
    a hexmetaphosphate selected from the group consisting of a sodium hexametaphosphate, a potassium hexmetaphosphate and combinations thereof present in an amount of about 63 percent by weight; and
    a reducing agent selected from the group consisting of a citric acid, tartaric acid, a sodium phosphonate, a sodium phosphite, a phosphorous acid, and combinations thereof present in an amount of about 11 percent by weight.

3. A corrosion control composition for inhibiting the corrosion of metals and inhibiting mineral scale based on 100 parts by weight, consisting of:
    a monosodium phosphate in an amount of 17-36 percent by weight;
    a polyphosphate selected from the group consisting of a sodium tripolyphosphate, a potassium tripoloyphosphate, and combinations thereof in an amount of 3-12 percent by weight;
    a hexmetaphosphate selected from the group consisting of a sodium hexametaphosphate, a potassium hexmetaphosphate and combinations thereof in an amount of 30-65 percent by weight; and
    a reducing agent selected from the group consisting of a citric acid, tartaric acid, a sodium phosphonate, a sodium phosphite, a phosphorous acid, and combinations thereof in an amount of about 11-50 percent by weight.

4. The corrosion control composition of claim 3, wherein said monosodium phosphate is present in an amount of about 18 percent by weight.

5. The corrosion control composition of claim 3, wherein said polyphosphate is a sodium tripolyphosphate.

6. The corrosion control composition of claim 5, wherein said polyphosphate is present in an amount of about 8 percent by weight and said hexmetaphosphate is present in an amount of about 63 percent by weight.

7. The corrosion control composition of claim 3, wherein said hexmetaphosphate is a sodium hexametaphosphate.

8. The corrosion control composition of claim 7, wherein said sodium hexametaphosphate is present in an amount of about 63 percent by weight.

9. The corrosion control composition of claim 3, wherein said reducing agent is a citric acid.

10. The corrosion control composition of claim 9, wherein said citric acid is present in an amount of about 11 percent by weight.

* * * * *